United States Patent [19]
Maness

[11] 3,954,086
[45] May 4, 1976

[54] LITTER BOX
[76] Inventor: Fred Maness, R.R. 1, Basehor, Kans. 66007
[22] Filed: Jan. 20, 1975
[21] Appl. No.: 542,119

Related U.S. Application Data
[63] Continuation-in-part of Ser. No. 473,912, May 28, 1974, abandoned.

[52] U.S. Cl. .............................................. 119/1
[51] Int. Cl.² ........................................ A01K 29/00
[58] Field of Search ................. 119/1, 52 R, 52, 53

[56] References Cited
UNITED STATES PATENTS

| | | |
|---|---|---|
| 3,111,932 | 11/1963 | Knutson ................................ 119/1 |
| 3,601,093 | 8/1971 | Cohen .................................... 119/1 |
| 3,656,457 | 4/1972 | Houston ................................. 119/1 |
| 3,831,557 | 8/1974 | Elesh ..................................... 119/1 |

Primary Examiner—Louis G. Mancene
Assistant Examiner—J. N. Eskovitz
Attorney, Agent, or Firm—Leitner, Palan & Martin

[57] ABSTRACT

A hollow cabinet having a shutter forming a portion of the top of the cabinet for supporting an animal and rotatably driven to transfer the animal's excretion and soiled litter into the cabinet after the animal leaves. An automatic dispenser provides metered amounts of litter onto the shutter.

10 Claims, 4 Drawing Figures

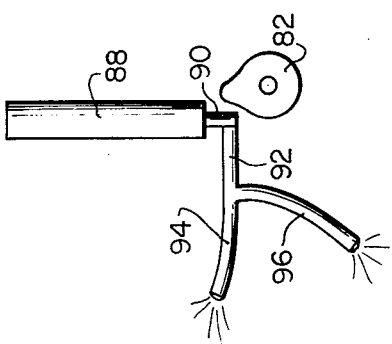
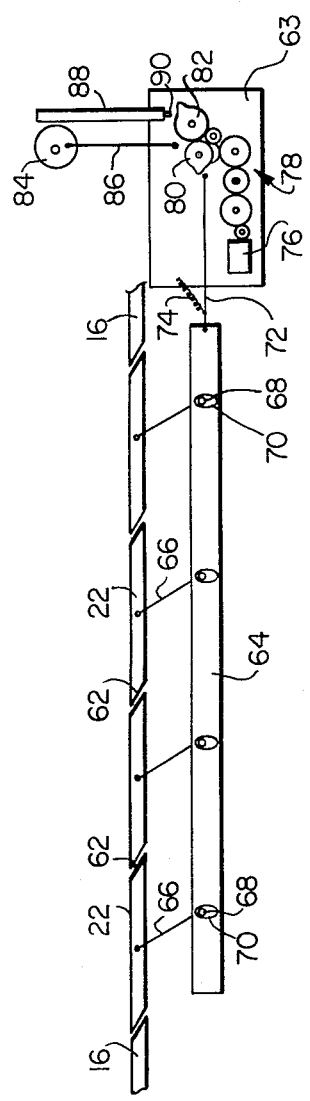
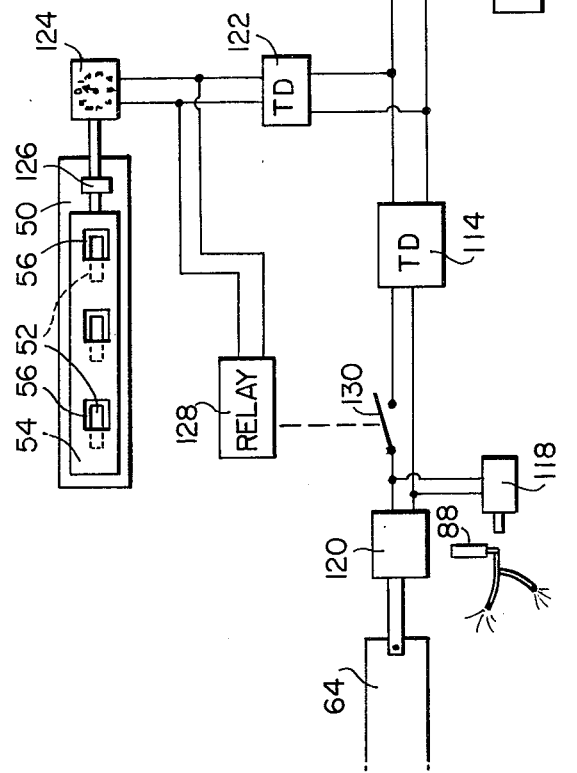

LITTER BOX

This application is a continuation in part of Ser. No. 473,912 filed May 28, 1974 and now abandoned.

BACKGROUND OF THE INVENTION

1. Field of the Invention

The present invention relates generally to litter boxes and more particularly to an automatic litter box.

2. Description of the Prior Art

As with other pets, cats present the problem of detecting, collecting and disposing of excrements. The most popular solution is to provide a pan or tray holding kitty litter or some other substance for the household cat to eliminate in. The cat usually scratches around and digs in the kitty litter with its paws, eliminates his excretion and then covers same with the material in the pan. Due to the frequency of elimination of the cat, the litter tray must be changed at least once a week.

In homes which have small children as well as cats, the presence of kitty and excretions inside for as long as a week constitutes an attractive nuisance for the child. Many germs and diseases may be transmitted to the child from the feces of the cat. Thus, there exists a need for a more complete and complex litter box wherein soiled litter (including excretions of the cat) is disposed of conveniently out of the sight and reach of small children. Even if there are no children in the house, it is still desirable to remove and deodorize the soiled litter and excretions.

In the prior art, numerous types of devices are designed as litter boxes which are operated mainly to deposit the used litter into a closed container after use by the cat. These devices require constant attention by the owner and thus have not become commercially popular.

Some automatic devices have been designed, but for various reasons have become inoperative. For example, U.S. Pat. No. 3,111,932 requires that the cat enters from the front to step on treadmill 27 in order to activate the system. It is well known that cats are very finicky animals and it is therefore very difficult to train a cat to eliminate into a small hole (as shown in the aforementioned patent).

Thus, there exists a need in the prior art to provide an automatic litter box which dispenses litter onto a surface and empties and soiled litter and cat excretions into a closed container, irrespective of how the cat decides to enter the litter box.

SUMMARY OF THE INVENTION

The present litter box solves the problems of the prior art by providing a shutter which occupies a portion of the top of the hollow cabinet and is rotatably mounted to said cabinet to open after the cat has left the top of the cabinet to transfer the excretions and the soiled litter into the hollow cabinet. A dispenser is provided which automatically dispenses metered amounts of litter onto the shutter from the cabinet. A drive means, which may be a mechanical motor and gear train or an electrical circuit including solenoids, coordinate the opening and closing of the shutter as well as the dispenser. The presence of the cat and its absence upon leaving the litter box is sensed by a switch which detects the vertical movement of the spring biased cabinet top. A source of chemicals is provided to spray deodorant or disinfectant onto the top surface of the shutter as well as into the interior of the hollow cabinet. A metal frame is provided interior to the cabinet which receives and supports a plastic bag to capture the excretions and soiled litter. The meter dispenser may include a corrugated cylinder in combination with a plate having a plurality of apertures. A cover over the apertures adjusts the amount of litter being fed into the corrugated cylinder. The cover may be mechanically or electrically adjusted to vary the metered amount of litter.

OBJECTS OF THE INVENTION

An object of the present invention is to provide a litter box which is automatically operated to remove excretions and soiled litter.

Another object is to provide a metered dispenser in combination with a litter box.

A further object of the invention is the provision of an electrical or mechanical drive means to coordinate the dispensing of fresh litter and the transfer of soiled litter into a closed container.

Still another object is to provide a mechanical or electrically adjusted setting for a kitty litter dispenser.

Still a further object of the invention is to provide a mechanically sound shutter structure which will support the weight of the cat.

An even further object of the invention is to provide a chemical dispensing system in combination with a litter box and litter dispenser.

Other objects, advantages and novel features of the present invention will become apparent from the following detailed description of the invention when considered in conjunction with the accompanying drawings.

BRIEF DESCRIPTION OF THE DRAWINGS

FIG. 2 is a plane view of the shutter assembly in combination with the mechanical drive system;

FIG. 3 is a schematic view of the chemical dispenser of the present invention; and FIG. 4 is a schematic of a totally electrical control or drive system for the present invention.

BRIEF DESCRIPTION OF THE PREFERRED EMBODIMENT

Figure 1:
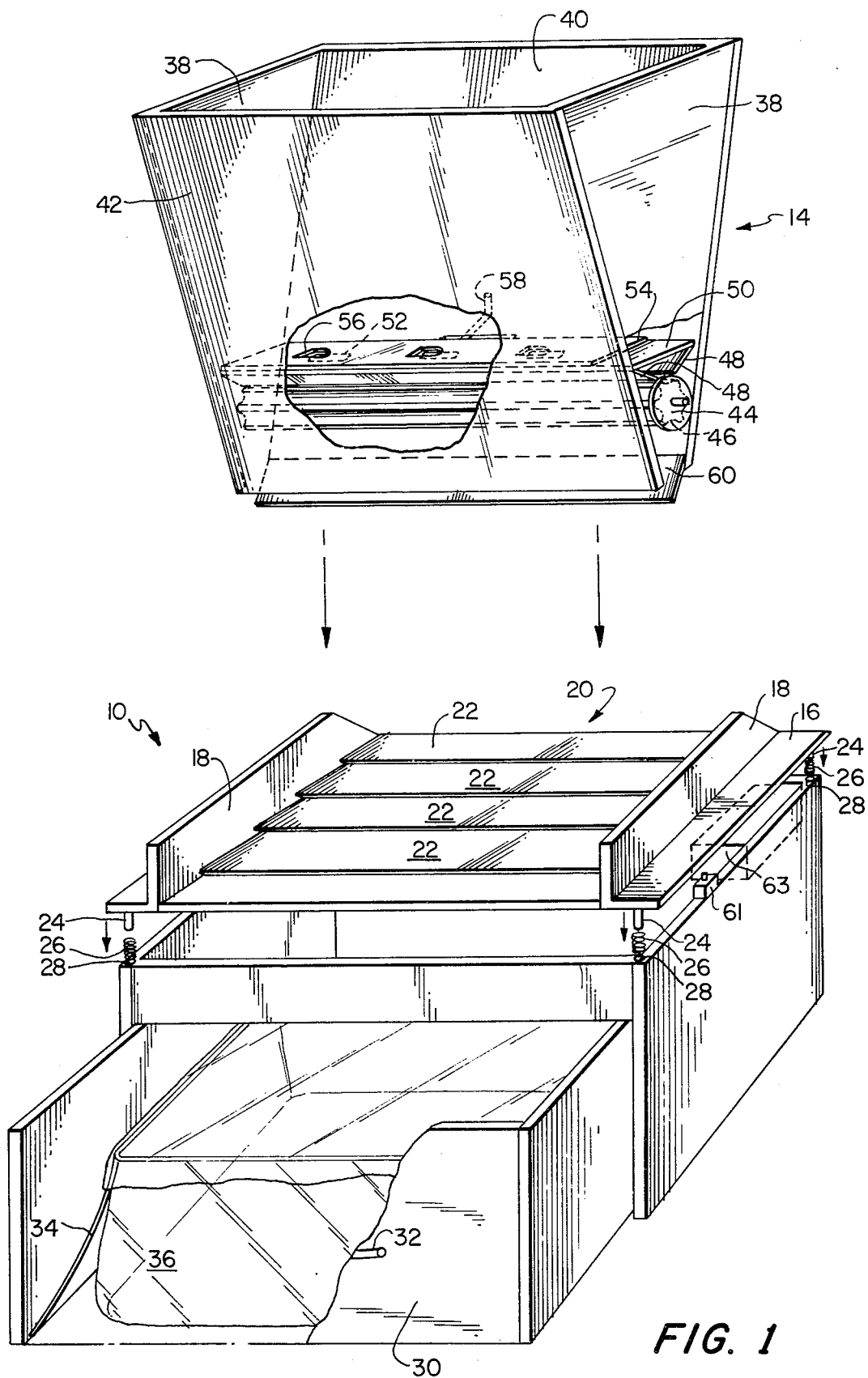
FIG. 1 is an exploded view of a preferred embodiment of the litter box of the subject invention.

FIG. 1 is an exploded view of a preferred embodiment of the litter box 10 having a hollow cabinet 12 with a litter dispenser 14 mounted thereon. The top 16 of cabinet 12 includes two solid rails 18 mounted thereon, with a shutter mechanism 20 lying therebetween. The shutter mechanism 20 comprises a plurality of slats or planks 22 which comprise a substantial portion of the top 16. The top 16 is resiliently coupled to the cabinet 12 by posts 24 and springs 26, which are received in apertures 28 in all four corners of the cabinet. The top is thus allowed to move vertically in response to the presence or absence of an animal thereon, and is removed as a unit for easy cleaning, inspection and repairs, if needed.

The front of the cabinet comprises a drawer 30 slidably received in the cabinet and having a handle 32 thereon. Interior to the drawer is a wire or metal frame 34 which supports a bag 36. When the drawer is closed, the bag 36 rests below the shutter mechanism 20 and receives the excretions and soiled litter. After the bag has been filled, the drawer is pulled open and the litter is removed by merely lifting out the bag and replacing it with a new one.

The litter dispenser 14, mounted permanently to the rear of top 16, includes two parallel side walls 38, substantially vertical rear wall 40 and an inclined front wall 42. The rear of rails 18 are slanted at the same incline angle as front wall 42 so as to mate therewith. The top of dispenser 14 is open to receive and store litter and is also open at the bottom to dispense metered amounts of litter onto the shutter mechanism 20. A roller 44 extends across the lower end of the interior of the dispenser 14 and includes a plurality of equally spaced recesses 46 which receive a predetermined amount of litter and dispenses the litter upon rotation. The roller 44 is rotatably received in the dispenser 14 and is connected to the drive means as will be explained in connection with FIG. 2.

Two internal guides 48 are provided to focus the flow of litter into the recesses 46 of roller 44. Extending across the interior of the dispenser 14 at the upper extremities of guides 48 is a metering plate 50 having a plurality of apertures 52 therein. Superimposed on plate 50 is a cover 54 having a corresponding number of apertures 56. Extending from the back of cover 56 through the rear wall 40 of dispenser 14 is a handle 58. By lateral adjustment of the cover 54 using handle 58, the amount of litter which is allowed to be transmitted through apertures 56 and 52 may be varied. When the apertures 52 and 56 are totally aligned, the largest quantity of litter may be allowed to pass therethrough. By moving the apertures 52 and 56 out of alignment, a smaller amount of litter is transmitted through to the roller 44. As will be explained more fully in the electrical schematic of FIG. 4, the roller 44 may be totally eliminated and the dispensing may be achieved using the plate 50 and the cover 54 alone. At the lower end of dispenser 14 is a deflection plate 60 inclined relative to the rear wall 40 so as to cause the litter to spread itself across the shutter mechanism 20.

Interior to the cabinet 12 is a sensor 61 which senses and indicates the position of the top being either at the loaded or unloaded position. Box 63 represents the drive mechanism which rotates the shutter mechanism and the dispenser mechanism 14 in response to the condition of switch 61. The general sequence of operation involves initially spreading litter on the shutter mechanism 20. The animal mounts the device 10 having its weight supported by the planks 22. The cat scratching around in the litter will then excrete and then will scratch the litter over the excretion and dismount. Once the sensor 61 has sensed dismounting of the animal, the drive mechanism 63 rotates the shutter mechanism 20 to move the planks into a vertical position allowing the excretion and soiled litter to fall into the interior cabinet in bag 36. Upon closing of the planks 22 to their horizontal position, drive mechanism 63 rotates the roller 14 to dispense new litter onto the shutter mechanism 20. The planks 22 may be coated with Teflon, for example, which will prevent the soiled litter and excretion from sticking thereto and will aid the transfer of the excretions and soiled litter into the bag 36.

A more detailed explanation of the shutter assembly 20 and the drive mechanism therefor (including a mechanical drive mechanism) is shown in FIG. 2. The shutters 22 form a substantially planar surface by having their ends 62 inclined so as to overlap or mate though there is a small space therebetween for mechanical clearance. Each of the planks 22 is connected to a single drive bar 64 by individual S-shaped cranks 66. The ends 68 of cranks 66 are each received within a vertical slot 70 in bar 64. As shown in FIG. 2, the bar 64 is in its first position allowing the shutters 22 to be closed. By leftward movement of the bar 64, the crank 66 moves from approximately a 45 degree angle on one side of the vertical as shown in FIG. 2 to a 45 degree angle on one side of the vertical as shown in FIG. 2 to a 45 degree angle on the other side of vertical so as to move the planks 22 from a horizontal to a vertical position. As the bar 64 moves to the left, the ends 68 travel in an arcuate path. The slot 70 will allow the bar 64 to move in a substantially horizontal direction while the ends 68 move in a substantially vertical direction. The bar 64 is connected to the drive mechanism 63 by a connecting rod 72. A spring 74 draws the bar 64 back to the left after the drive mechanism 63 is finished with its drive action.

The drive mechanism 63 includes a motor 76 which may be a wind-up mechanical motor or an electrically operated motor which is powered by a battery or an AC wall outlet. The motor 76 is activated when the switch 61 has sensed that the cat has dismounted. The motor 76 is connected to and drives cams 80 and 82 through a drive train 78. Cam 80 is rotated around so as to operate rod 72 to cause the lateral movement of bar 64 and operate a rod 68 pinned to a disk 84, which is connected to cylinder 44 to dispense a metered amount of litter after the shutter closes. A chemical dispenser 88 is also provided within the litter box 10. The rotation of cam 82 collides with the stem 90 of chemical dispenser 88 so as to dispense disinfectant and/or deodorant. By proper location of rods 86 and 72, the sequential operation of opening and closing of the shutter 20 and dispensing of the litter after the reclosing is achieved. The motor 76 may be one of the commercially available motors which operate for a fixed number of revolutions or fixed time and then automatically shut off. Alternately, it may be stopped by cam operation of a second switch which may be positioned to be controlled by cam 80 after the dispenser rod 86 to shut the system off after the shutter 20 has closed and new litter has been dispensed.

As illustrated in FIG. 3, the chemical dispenser 88 has a Y-shaped tubing 92 for spraying deodorant and disinfectant onto the shutter mechanism 20 by leg 94 and into the interior of the cabinet by leg 96.

The totally electrical schematic of FIG. 4 replaces the drive means of FIG. 2. A plug 100 connects the electrical system to a wall outlet. It should be noted that instead of the plug 100, the electrical power source may be a powered DC voltage source. Wires 102 and 104 connect the power source to the remainder of the circuit through switch 61, which senses the position of the top and a parallel circuit including normally open switch 110 and a normally closed switch 112. Relay 106, which controls the position of normally open switch 110, is connected to the parallel circuit by lead 108. Three time delays 114, 116 and 122, are connected to the output of relay 106. The time delay circuits may be bimetallic timed delays, relay time delays or electronic time delays, all of which are commonly available on the market. Time delay 116 controls normally closed switch 112. The output of time delay 114 is connected to solenoids 118 and solenoid 118, when activated, activates the chemical dispenser 88 to spray disinfectant and deodorizer as previously discussed. Solenoid 120 is connected to bar 64 which moves the shutter mechanism to its open position. Time delay 122 is connected to an adjustable timer 124 which controls a solenoid 126 which provides an automatic metering of plate 54. The amount of time that 124 activates solenoid 126 determines the amount of litter which will be transmitted through aligned apertures 52 and 56 directly onto the shutter mechanism 20. A relay 128, also connected to the output of time delay 122, opens a normally closed switch 130 to deactivate solenoid 120.

The time delays 114, 116 and 122 are fixed such that the following operation is achieved:

Once the cat mounts the top of the cabinet, switch 61 is closed. The current is transmitted to relay 106 which is activated and closes switch 110 to act as a latch to keep the current flowing through the remainder of the circuit. From the time the cat has closed switch 61, time delay 114 delays the transmission of current to the shutter and chemical dispenser portions of the circuit for a fixed amount of time. Since the cat generally takes no more than a couple of minutes to mount the device, scratch, excrete and bury its excretions, the time delay may be set for five minutes, for example. Upon the expiration of the time delay 114, solenoid 120 is activated to move bar 64 to open the shutter mechanism. Simultaneously, the solenoid 118 is activated to spray the chemical disinfectant or deodorant. One minute after time delay 114 is activated, time delay 122 is activated to activate relay 128 which opens a normally closed switch to solenoid 120 to cause the shutter mechanism to close. Time delay 122 also activates the timer 124 to dispense a metered amount of litter onto the closed shutters. In the examples given so far, since time delay 114 is set for 5 minutes, time delay 122 would be set for 6. A fixed time after time delay 114 has expired, the time delay 116 is activated to open normally closed switch 112 to totally deactivate the system. Since time delay 116 must allow sufficient time for the shutters to close and the largest amount of litter to be dispensed, time delay 116 may be, for example, 10 minutes. It should be noted that times selected for the delays are all approximate and may be adjusted for the appropriate habits of the cat involved. The schematic of FIG. 4 is only an example of one of the embodiments that is capable of producing desired sequential results. It should be noted that it is well within the scope of the art to vary the electrical circuitry so as to activate the solenoids 118, 120 and timer 126 in the proper sequence. Also, the activation of the drive system in FIG. 4 is in response to the top 16 being down where the system of FIG. 2 is in response to the top returning to the up position.

From the preceding description of the preferred embodiments, it is evident that the objects of this invention are attained. Although the invention has been described and illustrated in detail, it is to be clearly understood that the same is by of illustration and example only and is not to be taken by way of limitation. The spirit and scope of this invention are limited only by the terms of the appended claims. Also, while the example of a cat has been mentioned to describe the operation of this device, its' use is not limited to cats alone, but it may apply to any animal capable of being trained to use it.

What is claimed:

1. A litter box comprising:
   a hollow cabinet;
   means mounted to said cabinet for dispensing litter onto the top of said cabinet;
   shutter means forming a portion of the top of said cabinet for supporting an animal, excretions of said animal and said litter;
   means resiliently mounting said top of said cabinet to said cabinet to allow movement of said top in response to the mounting and dismounting of said animal;
   sensor means for detecting position of said top; and
   drive means responsive to said sensor means for causing said shutter means to open and to transfer said excretions and litter into said cabinet.

2. The litter box of claim 1 wherein said shutter means comprises a plurality of planks, each rotatably mounted to said cabinet, said planks forming a substantially planar surface and comprising substantially said top.

3. The litter box of claim 1 wherein said drive means opens said shutter means in response to said sensor means detecting that said top has been depressed and released.

4. The litter box of claim 1 including means for spraying a chemical substance on said shutter means and in said cabinet.

5. The litter box of claim 1 including a frame interior to said cabinet and a bag removably attached to said frame for receiving said excretions and soiled litter.

6. A litter box comprising:
   a hollow cabinet;
   means mounted to said cabinet for dispensing a metered amount of litter onto the top of said cabinet;
   shutter means forming a portion of the top of said cabinet for supporting an animal, excretions of said animal and said litter;
   drive means connected to said shutter means and said dispensing means for causing said shutter means to open and to transfer said excretions and litter into said cabinet after said animal has dismounted said top and for causing said dispensing means to provide litter on said shutter means after said shutter means is closed.

7. The litter box of claim 6 wherein said drive means comprises a first solenoid connected to said shutter means, a second solenoid connected to said dispensing means, and a control means connected to said first and second solenoids for providing the sequential operation.

8. The litter box of claim 6 wherein said drive means includes a mechanical motor, a gear train, a cam connected to said gear train and said shutter means, and a cam connected to said gear train and said dispensing means and wherein said dispensing means includes a corrugated roller.

9. The litter box of claim 6 wherein said dispensing means comprises a plate with at least one aperture therein and a cover superimposed on said plate and positioned by said drive means to dispense a metered amount of litter.

10. The litter box of claim 7 including an adjustable time delay means connected in series with said second solenoid for varying the amount of litter dispensed.

* * * * *